C. S. COLE.
METER INDICATOR.
APPLICATION FILED OCT. 22, 1921.
1,436,382.
Patented Nov. 21, 1922.
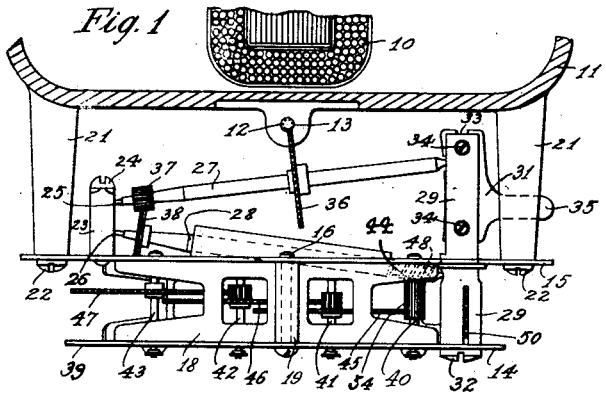
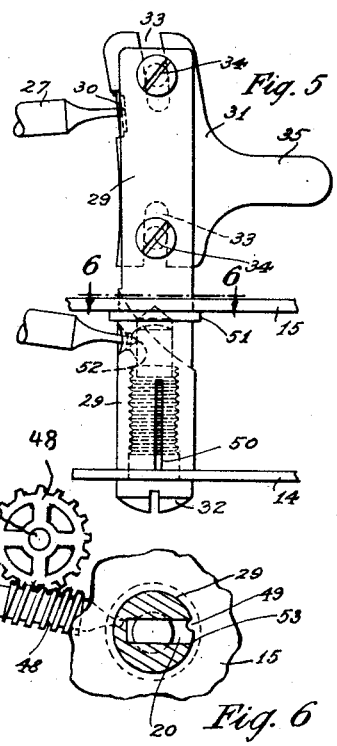
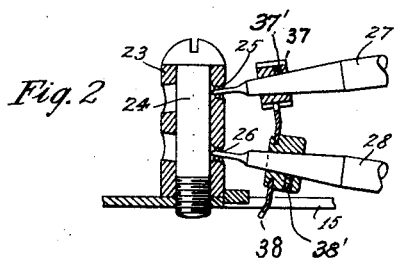
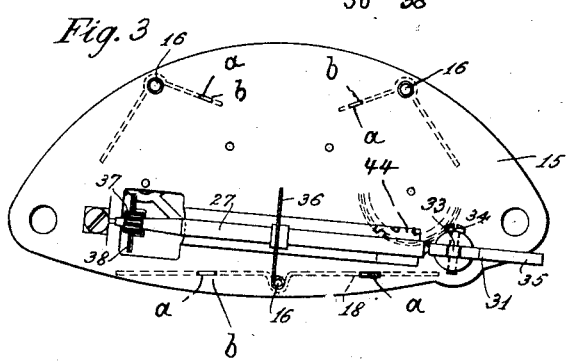
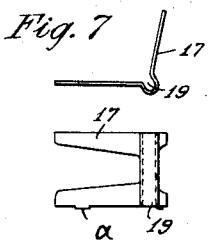
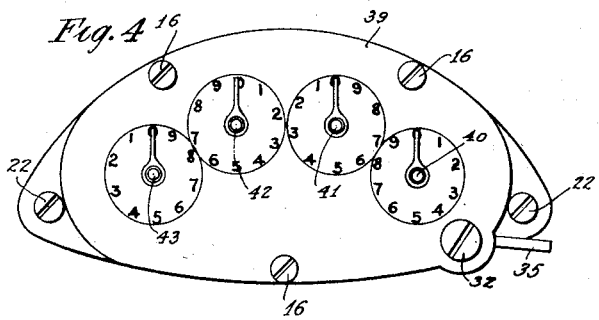
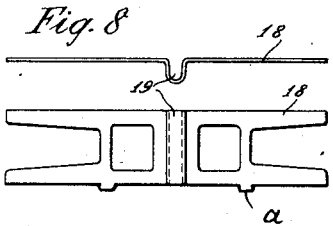
INVENTOR.
Charles S. Cole
BY
Chamberlain & Newman ATTORNEYS.

Patented Nov. 21, 1922.

1,436,382

UNITED STATES PATENT OFFICE.

CHARLES S. COLE, OF NEWTOWN, CONNECTICUT.

METER INDICATOR.

Application filed October 22, 1921. Serial No. 509,564.

*To all whom it may concern:*

Be it known that CHARLES S. COLE, a citizen of the United States, and resident of Newtown, in the county of Fairfield and State of Connecticut, has invented certain new and useful Improvements in Meter Indicators, of which the following is a specification.

My invention refers to new improvements in registers or indicators for integrating watt hour meters such for instance as are commonly employed for registering the consumption of electricity.

The invention aims to improve upon a commercial form of indicator by simplifying its construction and lessening the cost thereof; and further to provide a novelly constructed indicator which is especially adaptable to a general electric form of meter.

A further important object is to provide novel means for adjusting the ratio shaft for the purpose of better setting the gear carried thereon to engage the meter worm, and to furnish simple means for angularly supporting both the ratio shaft and the intermediate shaft so that they can accommodate varying sizes of gears whereby any preferred ratio between said shafts will be possible.

Another and important object is to provide an improved construction of the above character for the purpose stated wherein the first pointer shaft is directly engaged and operated by a driven worm, and to provide novel means whereby the same may be readily disconnected for the purpose of testing the meter or resetting the position of the indicating train.

A still further advantage is obtained in the arrangement of the gear upon the ratio shaft to engage with the meter worm and the arrangement of the worm of the intermediate shaft to be engaged by the gear of the first pointer shaft, so that due to the angular positioning of the shafts, the predominating thrusts come more directly upon the lower pivots, thereby insuring more constancy in the freedom of operation. These thrusts obviously come upon the lower pivots by virtue of gravity irrespective of any slight deviation from a vertical mounting of the meter, and further serves to minimize frictional drag.

A further advantage is obtained by the placing of the ratio and intermediate shafts at an angle to each other and arranging both of said shafts so that the gear upon the ratio shaft may engage the worm on the meter shaft in such manner that the inclination of the helix of said worm coincides with the operating face of the teeth of the gear upon the ratio shaft, and so that the gear upon the first pointer shaft correspondingly engages the worm upon the intermediate shaft.

With the above and other objects in view, the invention resides and consists in the construction and novel combination and arrangement of parts hereinafter more fully described, illustrated in the accompanying drawing and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawing forming a part of this specification and upon which, Fig. 1 is a top plan view of the indicator gear train, operatively connected with the frame of an electric meter;

Fig. 2 is an enlarged sectional elevation of a bearing post and the engaging pintle ends of the ratio shaft and the intermediate shaft;

Fig. 3 is a rear elevational view of the indicator mechanism;

Fig. 4 is a front elevational view of the same;

Fig. 5 is an enlarged elevational view of a different bearing post for the opposite pintle ends of both the ratio shaft and intermediate shaft, showing the adjustable sockets for the opposite pintles of the two said shafts and disclosing both of said opposite pintles in their operative positions;

Fig. 6 is a sectional plan view taken on line 6—6 in Fig. 5, looking down upon the back frame plate; and Figs. 7 and 8 show top edge and side views respectively of sheet metal spacer supports for insuring the relative and fixed positions of the front and rear plates of the indicator.

Referring in detail to the characters of reference marked upon the drawing, 10 represents a part of a coil of a commercial form of electric meter and 11 a portion of the casing for enclosing the same. 12 indicates a driving shaft mounted in bearings of the meter frame, and operated by the meter when the current is flowing therethrough. This form of a driven shaft is more or less common in several commercial types of meters and as a rule is mounted to operate in a vertical plane when the meter is properly mounted in an upright position. The shaft is cut to form a worm 13 whereby movement is transmitted therefrom to the indicating mechanism to register the amount of current flowing through the meter. This much of the device as now described is more or less of standard construction, though it may vary slightly in detail so far as different makes of meters are concerned.

The indicator is in a measure constructed along the lines of a clock movement and includes a supporting frame comprising a front plate 14 and a back plate 15, the two being secured at fixed distance apart by means of screws 16 and sheet metal spacer supports 17 and 18, there being one for each screw. The construction of the two forms of supports being more clearly shown in Figs. 7 and 8, the support of Fig. 7 is approximately L-shaped and including a socket 19 at its center to receive a screw 16, and the support of Fig. 8 is straight and includes at its center a similar socket 19 to similarly receive a screw 16. The side edges of said supports include lugs a that engage corresponding holes b in one or both of the plates 14 and 15 in a manner which will be very clear from Figs. 1 and 3 without further description. The sockets, obviously, partially surround the screw 16 in such a manner that the supports cannot become detached from said screws or from the indicator. While screws 16 have been shown and described for holding the plates in position, yet it will be obvious that studs having rivet ends may be used instead if desired. These screws or rivets would all preferably be positioned adjacent to the outer edges of the plates 14 and 15.

The frame of the indicator movement is detachably supported upon spaced apart posts 21 projecting from the meter frame, by means of screws 22 entering holes in the opposite ends of the rear plate 15 and imbedded in said posts. See Figs. 1, 3 and 4. This construction obviously serves for the detachable support of the indicator movement on the meter frame and insures an operative connection of the indicator mechanism with the driving shaft of the meter.

A post 23 mounted upon the rear face of the plate 15 and adjacent one end thereof by a screw 24, is provided with bearings denoted by 25 and 26, respectively, for mounting the near ends of the ratio and intermediate shafts, denoted by 27 and 28 respectively. The opposite end of the shaft 28 is removably mounted in the lower portion of a suitable post 29 positioned between the plates 14 and 15, and extended through and above the latter, while the opposite end of the ratio shaft is mounted in a bearing 30 of a plate 31, adjustably arranged in the slot in the upper portion of the post 29, and having circular movement about the pintle 25 as a center in the plane of the ratio shaft 27. The adjustment of the plate in the post 29 may be made in any ordinary or preferred manner. As shown, I preferably provide sector slots 33 in the opposite ends of the plate and equip the post 29 with screws denoted generally at 34, whereby the plate can be clamped in fixed relation to the post 29 after adjustment to desired position, a handle 35 upon the plate being for the purpose of readily manipulating the same when adjusting.

The post 29 is clamped to front plate 14 by means of screw 32 and is provided with a slot 50 cut therein and has its two side portions bent inwardly to give friction upon the threads of said screw 32. Upon loosening the screw 32 the clamp upon plate 14 is automatically broken and the friction arising from the spring slot 50 causes the post 29 to follow further unscrewing movement of the screw 32, thereby rotating the post 29 until its shoulder 53 engages the integral lug 49 in the back plate 15. By this movement of the post the pintle 52 has been rotatively displaced from its former position and by virtue of said displacement the worm 48 becomes disengaged from gear 44 on first pointer shaft, thereby disengaging the pointer train for resetting to zero reading or other desirable purposes. To remesh worm 48 with wheel 44 on first pointer shaft and again render the device operative within the intent of its purpose, the screw 32 is tightened, and the operations hereinbefore described are thereby reversed, bringing the two shafts back into the original plane governed by the contact of the side of the slot 20 against the integral lug 49 as shown in Fig. 6. Final tightening of the screw will not therefore rotate the post 29 further but mechanically clamps it to front plate 14. If desired the upper and lower portions of post 29 may be separately and independently mounted and operated.

The circular movement made possible by the manipulaton of handle 35 and screw slots 33 of the plate 31 in addition to serving as a means for suitable meshing of the worm wheel 36 with the worm 13 also permits the disengagement thereof for the purpose of running the electric meter proper for test, inspection or other purposes without detaching the register therefrom.

Numeral 36 denotes a gear upon th ratio shaft 27 that meshes with the worm 13 of the meter and is provided with adjustable means as above described for accurately positioning said gear against said worm 13. A small gear 37 is removably and adjustably mounted upon the tapered end of the ratio shaft 27 and close to the post 23 is adapted to mesh with a larger gear 38 also removably and adjustably mounted upon the tapered end of the intermediate shaft 28 by means of set screws 37' and 38'. The gears 37 and 38 are interchangeable upon the shafts 27 and 28, so that the driving ratio between the shafts may be changed accordingly.

The dial 39 is formed upon the front plate 14 in any preferred manner and as shown, includes four dials, each dial being provided with a series of numerals ranging from 1 to 10. The first dial located at the right as seen in Fig. 4, is to accommodate the first pointer on shaft 40, while the second dial is to accommodate the second pointer on shaft 41. The third dial accommodates the third pointer on shaft 42 and the fourth dial is read in connection with the fourth pointer on shaft 43. These pointer shafts are connected by a gear train so that the respective shafts, 41, 42, 43 are operated one-tenth of a turn with relation to a complete turn of the adjacent shaft through which it is driven, as for instance the first pointer shaft 40 includes a small gear 54 that meshes with and drives a larger gear 45 mounted on the pointer shaft 41. This shaft 41 in turn includes a small gear which drives a larger gear 46 upon the pointer shaft 42 while the said shaft 42 in a like manner operates the pointer shaft 43 through the gear 47. This portion of the gear train including the several dials and pointers is also of standard construction and is operated from the meter shaft through various forms of reducing mechanism which in the instance of this invention is of novel construction.

As already stated, the worm 13 upon the meter shaft 12 engages and drives the large gear 36 upon the ratio shaft 27 whose pintle ends are journaled in the bearings 25 and the adjustable bearing 30, respectively. The small gear 37 upon the ratio shaft meshes with and drives the larger gear 38 upon the intermediate shaft 28, the intermediate shaft including a worm 48 that meshes with and drives the before mentioned gear 44 upon the shaft 40.

It is to be noted that the pintle ends of the ratio and intermediate shafts journaled in the bearings 25 and 26 are closer together than are the opposite pintle ends of said shafts, so that said shafts are arranged at an angle to each other and to the frame plates 14 and 15. This angular positioning of the shafts insures the positioning of the worm on the intermediate shaft to better coincide with the teeth of the gear 44 on the first pointer shaft. It will be obvious that the pintle ends 30 and 52 of the shafts 27 and 28 are lower than the other ends thus disposing the said shafts upon angles so that the predominating thrust will come upon the lower pivot. On the other hand the far end of the adjoining shaft 27, which has its bearing in the plate 31, can be moved to and from either of the shafts 29 or 12 by the adjustment of the plate 31. The worm 48 may be either left or right hand with equal success; in the one case the gravity friction is aided, while in the other the worm friction lessens the gravity friction and betters the situation.

By reason of the fact that the shafts 27 and 28 are at an angle with respect to each other, the gears 37 and 38 can be substituted by larger or smaller gears thus increasing the scope of the range of speed changes to advantage.

Having thus described the invention, what I claim and desire to secure by Letters Patent is:

1. In a meter indicator, the combination with a pointer shaft having a gear and a meter driving shaft having a worm, of a pair of intermediate shafts, one of said intermediate shafts having a gear meshing with said worm of the meter shaft and the other of said intermediate shafts having a worm meshing with said pointer shaft gear, and both of said intermediate shafts having interengaging gears and being disposed at an adjustable diverging acute angle from said interengaging gears with respect to each other to accommodate various gear center distances, said interengaging gears in the instance of each intermediate shaft being removably and adjustably mounted upon the respective shafts.

2. In a meter indicator having a flat pointer face, a series of pointer shafts, an intermediate shaft geared to one of the pointer shafts, a ratio shaft connected to operate the intermediate shaft and positioned in oblique angles to the plane of the pointer face and a plane at right angles thereto, means for adjusting one end of the ratio shaft toward and from the intermediate shaft, and a meter driving shaft connected to operate said ratio shaft.

3. In a meter indicator, the combination with a driving shaft and worm, a ratio shaft bearing a gear to engage the worm, an intermediate shaft, interchangeable gears connecting the ratio and intermediate shaft, a pointer shaft, a worm and gear connecting the intermediate shaft with the pointer shaft, and means for adjusting the ratio shaft toward and from the worm of the driving shaft for disengaging the gear with respect to the worm at will.

4. A shaft bearing, comprising a tubular longitudinally split post having a shaft receiving recess in its side wall, a perforated support, and a headed screw engaging said post through said perforated plate, its head having bearing upon said plate, and adapted when screwed outwardly to secondarily turn said post with itself.

5. A shaft bearing, comprising a tubular longitudinally split post having a shaft receiving recess in its side wall, a perforated support, a headed screw engaging said post through said perforated plate, its head having bearing upon said plate, and adapted when screwed outwardly to secondarily turn said post with itself, and means for limiting said turning movement.

6. In a meter indicator, a pointer shaft, an intermediate shaft geared to said pointer shaft, a ratio shaft geared to said intermediate shaft, a meter driving shaft geared to said ratio shaft, and adjustable bearing means for adjusting the angular relation of said intermediate and ratio shafts.

7. In a meter indicator, a pointer shaft, an intermediate shaft geared to said pointer shaft, a ratio shaft geared to said intermediate shaft, a meter driving shaft geared to said ratio shaft, and a member having a bearing for one end of said intermediate shaft and adjustable in an arc described about the other end to adjust the angular relation of said shaft relatively to said ratio shaft.

8. In a meter indicator, a pointer shaft, an intermediate shaft geared to said pointer shaft, a ratio shaft geared to said intermediate shaft, a meter driving shaft geared to said ratio shaft, bearing means for adjusting one end of said intermediate shaft toward and from said ratio shaft, and bearing means for said ratio shaft adapted to move it about one end as a pivot in a direction transverse to the adjusting movement of said intermediate shaft.

Signed in the county of Fairfield and State of Connecticut this 15th day of October, A. D., 1921.

CHARLES S. COLE.

Witnesses:
C. M. NEWMAN,
WM. G. ROCKWELL.